(12) United States Patent
Thackeray et al.

(10) Patent No.: US 10,069,143 B2
(45) Date of Patent: Sep. 4, 2018

(54) COBALT-STABILIZED LITHIUM METAL OXIDE ELECTRODES FOR LITHIUM BATTERIES

(71) Applicant: UCHICAGO ARGONNE, LLC, Chicago, IL (US)

(72) Inventors: Michael M. Thackeray, Naperville, IL (US); Jason R. Croy, Plainfield, IL (US); Brandon R. Long, Plainfield, IL (US); Joong Sun Park, Woodridge, IL (US); Eungje Lee, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 374 days.

(21) Appl. No.: 14/733,512

(22) Filed: Jun. 8, 2015

(65) Prior Publication Data

US 2015/0318546 A1  Nov. 5, 2015

Related U.S. Application Data

(63) Continuation-in-part of application No. 14/554,762, filed on Nov. 26, 2014.

(Continued)

(51) Int. Cl.
*H01M 4/131* (2010.01)
*H01M 4/505* (2010.01)

(Continued)

(52) U.S. Cl.
CPC ........... *H01M 4/505* (2013.01); *H01M 4/131* (2013.01); *H01M 4/485* (2013.01); *H01M 4/525* (2013.01);

(Continued)

(58) Field of Classification Search
CPC ...... H01M 4/505; H01M 4/485; H01M 4/131; H01M 4/525; H01M 4/0471;

(Continued)

(56) References Cited

U.S. PATENT DOCUMENTS 5,153,081 A  10/1992 Thackeray et al.
5,160,712 A  11/1992 Thackeray et al.

(Continued)

FOREIGN PATENT DOCUMENTS

WO    2012067675    5/2012

OTHER PUBLICATIONS

Myung (Electrochemical evaluation of mixed oxide electrode for li-ion secondary batteries:Li1.1Mn0.9O4 and LiNi0.8Co0.15Al0.05O2, Journal of Power Sources 146 (2005)) 222-225).*

(Continued)

*Primary Examiner* — Cynthia Kyung Soo Walls
(74) *Attorney, Agent, or Firm* — Olson & Cepuritis, Ltd.

(57) ABSTRACT

An electrode material comprising a composite lithium metal oxide, which in an initial state has the formula: $y[xLi_2MO_3 \cdot (1-x)LiM'O_2] \cdot (1-y)Li_{1+d}Mn_{2-z-d}M''_zO_4$; wherein $0 \leq x \leq 1$; $0.75 \leq y < 1$; $0 < z \leq 2$; $0 \leq d \leq 0.2$; and $z-d \leq 2$. M comprises one or more metal ions that together have an average oxidation state of +4; M' comprises one or more metal ions that together have an average oxidation state of +3; and M" comprises one or more metal ions that together with the Mn and any excess proportion of lithium, "d", have a combined average oxidation state between +3.5 and +4. The $Li_{1+d}Mn_{2-z-d}M''_zO_4$ component comprises a spinel structure, each of the $Li_2MO_3$ and the $LiM'O_2$ components comprise layered structures, and at least one of M, M', and M" comprises Co. Cells and batteries comprising the electrode material also are described.

20 Claims, 10 Drawing Sheets

Related U.S. Application Data

(60) Provisional application No. 61/920,283, filed on Dec. 23, 2013.

(51) Int. Cl.
  H01M 4/525 (2010.01)
  H01M 4/485 (2010.01)
  H01M 10/052 (2010.01)
  H01M 4/04 (2006.01)

(52) U.S. Cl.
  CPC ........ *H01M 4/0471* (2013.01); *H01M 10/052* (2013.01); *H01M 2220/20* (2013.01); *H01M 2220/30* (2013.01); *Y02E 60/122* (2013.01)

(58) Field of Classification Search
  CPC ......... H01M 2220/30; H01M 2220/20; H01M 10/052; Y02E 60/122
  See application file for complete search history.

(56) References Cited

U.S. PATENT DOCUMENTS

| | | |
|---|---|---|
| 5,316,877 A | 5/1994 | Thackeray et al. |
| 5,981,106 A | 11/1999 | Amine et al. |
| 6,482,374 B1 | 11/2002 | Kumar et al. |
| 6,555,269 B2 | 4/2003 | Cho et al. |
| 6,677,082 B2 | 1/2004 | Thackeray et al. |
| 6,680,143 B2 | 1/2004 | Thackeray et al. |
| 6,878,487 B2 | 4/2005 | Cho et al. |
| 6,916,580 B2 | 7/2005 | Cho et al. |
| 6,984,469 B2 | 1/2006 | Kweon et al. |
| 7,087,348 B2 | 8/2006 | Holman et al. |
| 7,138,209 B2 | 11/2006 | Kweon et al. |
| 7,303,840 B2 | 12/2007 | Thackeray et al. |
| 7,314,682 B2 | 1/2008 | Thackeray et al. |
| 7,384,664 B2 | 6/2008 | Desten et al. |
| 7,445,871 B2 | 11/2008 | Suh et al. |
| 7,468,223 B2 | 12/2008 | Thackeray et al. |
| 7,635,536 B2 | 12/2009 | Johnson et al. |
| 7,790,308 B2 | 9/2010 | Johnson et al. |
| 7,927,506 B2 | 4/2011 | Park |
| 7,935,270 B2 | 5/2011 | Park |
| 8,080,340 B2 | 12/2011 | Thackeray et al. |
| 8,808,912 B2 | 8/2014 | Thackeray et al. |
| 9,070,489 B2 | 6/2015 | Sharma et al. |
| 2001/0046628 A1 | 11/2001 | Oesten et al. |
| 2003/0086863 A1* | 5/2003 | Noguchi ............ C01G 45/1242 423/599 |
| 2003/0108790 A1 | 6/2003 | Manthiram et al. |
| 2004/0076882 A1* | 4/2004 | Hosoya ................. H01M 4/131 429/223 |
| 2005/0026040 A1 | 2/2005 | Thackeray et al. |
| 2005/0153206 A1 | 7/2005 | Oesten et al. |
| 2006/0216605 A1 | 9/2006 | Shirakata et al. |
| 2009/0136839 A1 | 5/2009 | Kraznov et al. |
| 2009/0224212 A1 | 9/2009 | Manthiram et al. |
| 2010/0086853 A1 | 4/2010 | Venkatachalam et al. |
| 2010/0190058 A1 | 7/2010 | Thackeray et al. |
| 2010/0207577 A1 | 8/2010 | Sugiyama et al. |
| 2012/0263998 A1 | 10/2012 | Thackeray et al. |
| 2013/0078518 A1 | 3/2013 | Thackeray et al. |
| 2014/0127398 A1 | 5/2014 | Thackeray et al. |
| 2015/0180031 A1 | 6/2015 | Thackeray et al. |

OTHER PUBLICATIONS

Nam (In-situ x-ray diffraction studies of mixed LiMn2O4—LiN1/3Co1/3Mn1/3O2 composite cathode in li-ion cells during charge-discharge cycling, Journal of Power Sources 192 (2009) 652-659).*

Amatucci, G. et al., Optimization of Insertion Compounds Such as LiMn2O4 for Li-Ion Batteries, Journal of the Electrochemical Society, 149 (12), K31-K46, (2002).

Amine, K. et al., A New Three-Volt Spinel Li1+xMn1.5Ni0.5O4 for Secondary Lithium Batteries, Journal Electrochemical Society, vol. 143, (5), 1607-1613 (1996).

Arunkumar, T.A. et al., Influence of Lattice Parameter Differences on the Electrochemical Performance of the 5 V Spinel LiMn1.5—yNi0.5—zMy+zO4 (M=Li, Mg, Fe, Co, and Zn), Electrochemical and Solid State Letters, vol. 8, (8), A403-A405 (2005).

Belharouak, I. et al., Identification of LiNi0.5O4 Spinel in Layered Manganese Enriched Electrode Materials, Electrochemistry Communications 13, 232-236 (2011).

Cabana, J. et al., Structural and Electrochemical Characterization of Composite Layered-Spinel Electrodes Containing Ni and Mn for Li-Ion Batteries, Journal of the Electrochemical Society 156 (9), A730-A736 (2009).

Cabana, J. et al., Structural Complexity of Layered-Spinel Composite Electrodes for Li-Ion Batteries, J. Mater. Res. 25 (8), 1601-1616 (2010).

Chen, Z. et al., Effect of a ZrO2 Coating on the Structure and Electrochemistry of LixCoO2 When Cycled to 4.5 V, Electrochemical and Solid State Letters, 5 (10), A213-A216, (2002).

Cho, J. et al., Novel LiCoO2 Cathode Material with Al2O3 Coating for a Li Ion Cell, Chemistry of Materials 12, 3788-3791, (2000).

Cho, J. et al., High-Performance ZrO2-Coated LiNiO2 Cathode Material, Electrochemical and Solid-State Letters, 4 (10), A159-A161, (2001).

Choi, W. et al., Superior Capacity Retention Spinel Oxyfluoride Cathodes for Lithium-Ion Batteries, Electrochemical and Solid State Letters, 9 (5), A245-A248 (2006).

Croy, J. R., et al., Designing High-Capacity, Lithium-Ion Cathodes Using X-ray Absorption Spectroscopy, Chemistry of Materials 23, 5415-5424 (2011).

Croy, J. R. et al., Li2MnO3-Based Composite Cathodes for Lithium Batteries: A Novel Synthesis Approach and New Structures, Electrochemistry Communications 13, 1063-1066 (2011).

Gummow, R.J. et al., Improved Capacity Retention in Rechargeable 4 V Lithium/Lithium-Manganese Oxide (Spinel) Cells, Solid State Ionics 69, 59-67 (1994).

Gummow, R.J. et al., A Reinvestigation of the Structures of Lithium-Cobalt-Oxides With Neutron-Diffraction Data, Mat. Res. Bull. 28 (11), 1177-1184 (1993).

Gummow, R.J. et al., Spinel Versus Layered Structures for Lithium Cobalt Oxide Synthesised at 400° C., Mat. Res. Bull. 28 (3), 235-246 (1993).

Gummow, R.J. et al., Characterization of LT—LixCo1—yNiyO2 Electrodes for Rechargeable Lithium Cells, Journal of The Electrochemical Society 140 (12) 3365-3368 (1993).

Gummow, R.J. et al., Lithium-Cobalt-Nickel-Oxide Cathode Materials Prepared at 400° C. for Rechargeable Lithium Batteries, Solid State Ionics 53-56, 681-687 (1992).

Gummow, R.J. et al., Structure and Electrochemistry of Lithium Cobalt Oxide Synthesised at 400° C., Mat. Res. Bull. 27 (3), 327-337 (1992).

Jafta, C.J. et al., Microwave-Assisted Synthesis of High-Voltage Nanostructured LiMn1.5Ni0.5O4 Spinel: Tuning the Mn3+ Content and Electrochemical Performance, ACS Applied Materials and Interfaces, vol. 5, 7592-7598 (2013).

Johnson, C.S. et al., Lithium-Manganese Oxide Electrodes with Layered-Spinel Composite Structures xLi2MnO3•(1−x)Li1+yMn2—yO4 (0 < x < 1, 0 ≤ y ≤ 0.33) for Lithium Batteries, Electrochemistry Communications 7, 528-536 (2005).

Johnson, C.S. et al., Anomalous Capacity and Cycling Stability of xLi2MnO3• (1−x)LiMO2 Electrodes (M=Mn, Ni, Co) in Lithium Batteries at 50° C., Electrochemistry Communications 9, 787-795 (2007).

Johnson, C.S. et al., The Significance of the Li2MnO3 Component in 'Composite' xLi2MnO3.(1−x)LiMn0.5Ni0.5O2 Electrodes, Electrochemistry Communications 6, 1085-1091 (2004).

Kang, S.H. et al., Layered Li(Li0.2Ni0.15+0.5zCo0.10Mn0.55−0.5z)O2—zFz Cathode Materials for Li-ion Secondary Batteries, Journal of Power Sources 146, 654-657, (2005).

(56) References Cited

OTHER PUBLICATIONS

Kang, S.H. et al., Stabilization of xLi2MnO2.(1-x)LiMO2 Electrode Surfaces (M=Mn, Ni, Co) with Mildly Acidic, Fluorinated Solutions, Journal of the Electrochemical Society, 155 (4), A269-A275, (2008).

Kang, S.H. et al., The Effects of Acid Treatment on the Electrochemical Properties of 0.5 Li2MnO3.0.5 LiNi0.44Co0.25Mn0.31O2 Electrodes in Lithium Cells, Journal of The Electrochemical Society, 153 (6), A1186-A1192, (2006).

Kim, D. et al., Composite 'Layered-Layered-Spinel' Cathode Structures for Lithium-Ion Batteries, Journal of The Electrochemical Society 160 (1), A31-A38 (2013).

Kim, J.S. et al., The Electrochemical Stability of Spinel Electrodes Coated with ZrO2, Al2O3, and SiO2 From Colloidal Suspensions, Journal of The Electrochemical Society 151 (10), A1755-A1761 (2004).

Kim, J. et al., Electrochemical and Structural Properties of xLi2M'O3 • (1-x)LiMn0.5Ni0.5O2 Electrodes for Lithium Batteries (M'=Ti, Mn, Zr; 0≤ ≤x ≤ 0.3), Chemical Materials 16, 1996-2006 (2004).

Kim, D. et al., High-Energy and High Power Li Rich Nickel Manganese Oxide Electrode Materials, Electrochemistry Communications 12, 1618-1621 (2010).

Kim, J. et al., Controlled Nanoparticle Metal Phosphates (Metal=Al, Fe, Ce, and Sr) Coatings on LiCoO2 Cathode Materials, Journal of The Electrochemical Society 152 (6), A1142-A1148 (2005).

Kim, G.H., et al. Improvement of High-Voltage Cycling Behavior of Surface-Modified Li[Ni1/3Co1/3Mn1/3]O2 Cathodes by Fluorine Substitution for Li-Ion Batteries, Journal of the Electrochemical Society 152 (9), A1707-A1713, (2005).

Lee, E-S et al., Understanding the Effect of Synthesis Temperature on the Structural and Electrochemical Characteristics of Layered-Spinel Composite Cathodes for Lithium-Ion Batteries, Journal of Power Sources 240, 193-203 (2013).

Long, B.R. et al. Advances in Stabilizing 'Layered-Layered' xLi2MnO3 (1-x)LiMO2 (M=Mn, Ni, Co) Electrodes with a Spinel Component, Journal of The Electrochemical Society 161 (14), A2160-A2167 (2014).

Nam, K-W et al., In Situ X-ray Diffraction Studies of Mixed LiMn2O4—LiNi1/3Co1/3Mn1/3O2 Composite Cathode in Li-Ion Cells During Charge-Discharge Cycling, Journal of Power Sources 192, 652-659 (2009).

Park, B.C. et al., Improvement of Structural and Electrochemical Properties of AlF3-Coated Li[Ni1/3Co1/3Mn1/3]O2 Cathode Materials on High Voltage Region, Journal of Power Sources 178, 826-831 (2008).

Park, S-H. et al., Lithium-Manganese-Nickel-Oxide Electrodes with Integrated Layered-Spinel Structures for Lithium Batteries, Electrochemistry Communications 9, 262-268 (2007).

Sun, Y. K. et al., AlF3-Coating to Improve High Voltage Cycling Performance of Li[Ni1/3Co1/3Mn1/3]O2 Cathode Materials for Lithium Secondary Batteries, Journal of the Electrochemical Society 154 (3), A168-A172 (2007).

Thackeray, M., The Need for New Lithium-Ion Battery Materials, The 25th International Battery Seminar & Exhibit, Fort Lauderdale, Florida, Mar. 2008.

Thackeray, M.M. et al., Integrated Electrode Structures for Lithium-Ion Batteries, International Workshop on Fundamentals of Lithium-Based Batteries, Schloss Ringberg, Tegernsee, Germany, Nov. 2008.

Thackeray, M.M. et al., Advances in Manganese-Oxide 'Composite' Electrodes for Lithium-Ion Batteries, Journal of Materials Chemistry 15, 2257-2267 (2005).

Thackeray, M.M., Structural Considerations of Layered and Spinel Lithiated Oxides for Lithium Ion Batteries, Journal of The Electrochemistry Society 142 (8), 2558-2563 (1995).

Thackeray, M.M. et al., Li2MnO3-Stablized LiMO2 (M=Mn, Ni, Co) Electrodes for Lithium-Ion Batteries, Journal of Materials Chemistry 17, 3112-3125 (2007).

Van Der Ven, A. et al., Ordering in Lix(Ni0.5Mn0.5)O2 and Its Relation to Charge Capacity and Electrochemical Behavior in Rechargeable Lithium Batteries, Electrochemistry Communications 6, 1045-1050 (2004).

Ward, R.M. et al., Olivine Composite Cathode Materials for Improved Lithium Ion Battery Performance, U.S. Department of Energy, Journal of Undergraduate Research, vol. 6 (91), 2006.

Winter et al., What are Batteries, Fuel Cells and Supercapacitors? Chemical Reviews 104, 4245-4269 (2004).

Wu, Y. et al., Surface Modification of High Capacity Layered Li[Li0.2Mn0.54Ni0.13Co0.13]O2 Cathodes by AlPO4, Journal of the Electrochemical Society 155 (9), A635-A641, (2008).

Yang, J. et al., Synthesis and Characterization of Carbon-Coated Lithium Transition Metal Phosphates LiMPO4 (M=Fe, Mn, Co, Ni) Prepared via a Nonaqueous Sol-Gel Route, Journal of the Electrochemical Society 153 (4), A716-A723 (2006).

Yang, J. et al., Intergrown LiNi0.5Mn1.5O4.LiNi1/3Co1/3Mn1/3O2 Composite Nanorods as High-Energy Density Cathode Materials for Lithium-Ion Batteries, Journal of Materials Chemistry A, 1, 13742-13745 (2013).

* cited by examiner

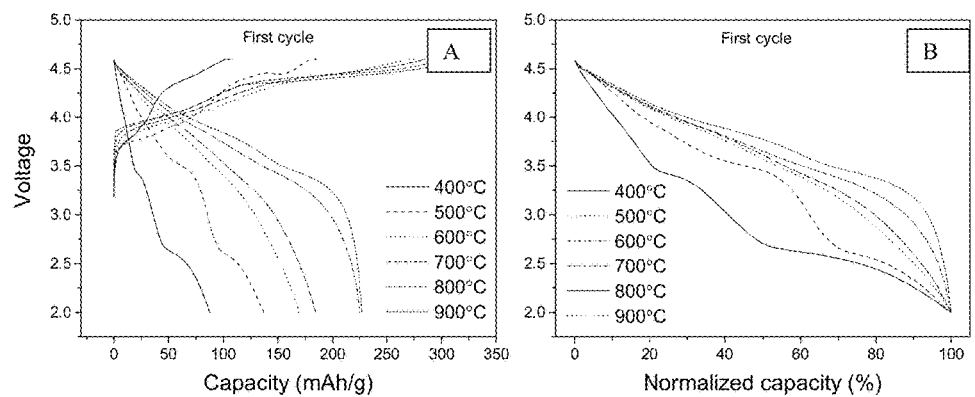
FIG. 8
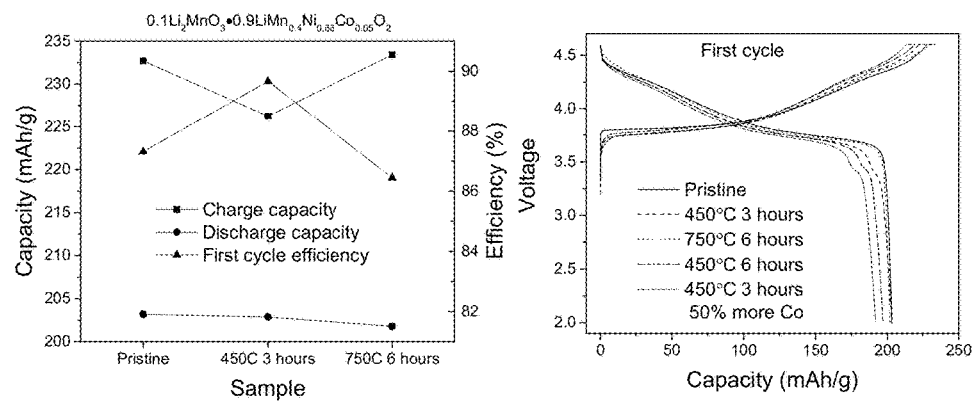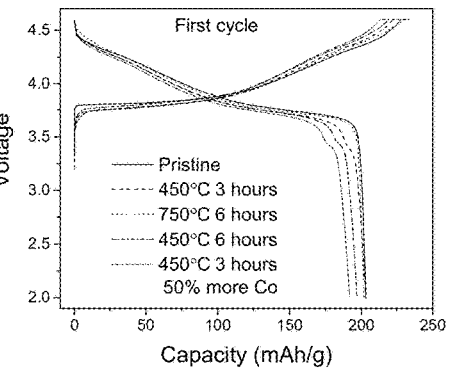
FIG. 9  FIG. 10

COBALT-STABILIZED LITHIUM METAL OXIDE ELECTRODES FOR LITHIUM BATTERIES

CROSS-REFERENCE TO RELATED APPLICATIONS

This application is a continuation-in-part of U.S. application Ser. No. 14/554,762 filed on Nov. 26, 2014, which claims the benefit of U.S. Provisional Application Ser. No. 61/920,283, filed on Dec. 23, 2013, each of which is incorporated by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials for electrochemical cells and batteries. Such cells and batteries are used widely to power numerous devices, for example, portable electronic appliances and medical, transportation, aerospace, and defense systems.

BACKGROUND

State-of-the-art lithium batteries do not provide sufficient energy to power electric vehicles for an acceptable driving range. This limitation arises because the electrodes, both the anode, typically graphite, and the cathode, typically, layered $LiMO_2$ (M=Mn, Co, Ni), spinel $LiMn_2O_4$ and olivine $LiFePO_4$, do not offer sufficient capacity or a high enough electrochemical potential to meet the energy demands. Approaches that are currently being adopted to enhance the energy of lithium-ion batteries include the exploitation of composite cathode structures that offer a significantly higher capacity compared to conventional cathode materials. In particular, lithium-rich and manganese-rich high capacity cathodes, such as $xLi_2MnO_3 \cdot (1-x)LiMO_2$ (M=Mn, Ni, Co) materials (often referred to as 'layered-layered' materials, because both the $Li_2MnO_3$ and $LiMO_2$ components have layered-type structures) suffer from 'voltage fade' on repeated cycling, which reduces the energy output and efficiency of the cell, thereby compromising the management of cell/battery operation.

There is an ongoing need for new electrode materials to ameliorate the problems associated with the voltage fade of 'layered-layered' electrode materials. The electrodes, electrochemical cells, and batteries of this invention address this need.

SUMMARY OF THE INVENTION

The present invention provides a composite lithium metal oxide electrode material comprising a three-component, 'layered-layered-spinel' composite, which in an initial state (i.e., as prepared) has the formula: $y[xLi_2MO_3 \cdot (1-x)LiM'O_2] \cdot (1-y)Li_{1+d}Mn_{2-z-d}M''_zO_4$; wherein $0 \leq x \leq 1$; $0.75 \leq y < 1$; $0 < z \leq 2$; $0 \leq d \leq 0.2$; and $z-d \leq 2$. M comprises one or more metal ions that together have a combined average oxidation state of +4 (e.g., Mn, Ti and Zr); M' comprises one or more metal ions that together have a combined average oxidation state of +3 (e.g., Mn and Ni, or Mn, Ni and Co); and M" comprises one or more metal ions (e.g., Ni, Co, or Ni and Co) that together with the Mn and any excess proportion of lithium, "d", in the spinel formula above have a combined average oxidation state between +3.5 and +4; preferably, M" includes at least some Co. The $Li_{1+d}Mn_{2-z-d}M''_zO_4$ component comprises a spinel crystal structure, each of the $Li_2MO_3$ and the $LiM'O_2$ components comprise layered crystal structures, and at least one of M, M', and M" comprises Co. In some embodiments, $0.85 \leq y < 1$ or $0.9 \leq y < 1$, or $0.85 \leq y \leq 0.9$. Preferably, $0 \leq x \leq 0.5$. The 'layered-layered-spinel' materials of the invention surprisingly ameliorate the voltage fade problem associated conventional 'layered-layered' and 'layered-spinel' positive electrode materials in lithium battery applications.

Preferably, M comprises at least one metal selected from the group consisting of Mn, Ti and Zr; M' comprises at least one metal selected from the group consisting of Mn, Ni, and Co, and M" comprises at least one metal selected from the group consisting of Ni, and Co. Optionally, each of M and M' can independently further comprise at least one metal selected from the group consisting of Al, Mg, and Li; M can further comprise at least one metal selected from the group consisting of a first or second row transition metal other than Mn, Ti, and Zr; M' can further comprise at least one metal selected from the group consisting of a first or second row transition metal other than Mn, Ni and Co, provided that the average oxidation state of the combined M ions is +4, and the average oxidation state of the combined M' ions is +3; and M" can further comprise at least one metal selected from the group consisting of Al, Mg, and a first or second row transition metal other than Ni and Co (e.g., Ti, Fe, Zr) such that the M" ions in the spinel formula $Li_{1+d}Mn_{2-z-d}M''_zO_4$ have a combined average oxidation state between +3.5 and +4.

In some embodiments, the spinel component, $Li_{1+d}Mn_{2-z-d}M''_zO_4$, is a lithium-rich spinel (i.e., including an excess proportion of Li, represented by "d", where $0 < d \leq 0.2$). Preferably, the proportion, z, of M" is in the range of $0.2 < z \leq 0.6$; and M" comprises Ni, Co, or a combination thereof. For example, M" can comprise at least one metal selected from the group consisting of Ni and Co; d>0; and 2−d−z>0. In some other preferred embodiments, M is Mn; M' comprises Mn and Ni; and the spinel component, $Li_{1+d}Mn_{2-z-d}M''_zO_4$, comprises Mn, Ni, and Co. For example, M" can comprise at least one metal selected from the group consisting of Ni and Co; d>0; and 2−d−z>0.

The present invention also provides a layered-layered-spinel electrode material in which M" comprises Ni and Co; Co constitutes about 1 atom percent to about 30 atom percent of transition metals in the spinel component, $Li_{1+d}Mn_{2-z-d}M''_zO_4$; and the combination of Mn and Ni constitutes about 70 atom percent to about 99 atom percent of the transition metals in the spinel component. Preferably, the combination of Mn and Ni constitutes about 80 atom percent of the transition metals in the spinel component and Co constitutes about 20 atom percent of the transition metals in the spinel component. In a preferred embodiment, the spinel component constitutes about 50 atom percent Mn, about 30 atom percent Ni, and about 20 atom percent Co, based on the total transition metals in the spinel component.

The composition of the layered-layered-spinel electrodes of this invention can therefore be tailored for optimum electrochemical performance. In particular, it has been discovered that the cobalt content plays a significant role in determining the performance of these materials.

In a particular embodiment of the invention, the Co content in the $y[xLi_2MO_3 \cdot (1-x)LiM'O_2] \cdot (1-y)Li_{1+d}Mn_{2-z-d}$ M"$_z$O$_4$ electrode comprises more than 50% of the combined M, M', and M" content. Alternatively, the Co content can comprise less than 50% of the combined M, M', and M" content. In yet another embodiment, the Ni content in the y[xLi$_2$MO$_3$.(1−x)LiM'O$_2$].(1−y)Li$_{1+d}$Mn$_{2-z-d}$ M"$_z$O$_4$ electrode can comprise more than 50% of the combined M, M', and M" content, for example, 60%, 70%, 80% or 90%.

In some embodiments, x=0, and the electrode material comprises a two-component layered-spinel composite compound, which in an initial state has the formula: yLiM'O$_2$. (1−y)Li$_{1+d}$Mn$_{2-z-d}$M"$_z$O$_4$; wherein 0.75≤y<1; 0<z≤2; 0≤d≤0.2; z−d≤2; M' comprises one or more metal ions that together have a combined average oxidation state of +3; and M" comprises one or more metal ions that together with the Mn and excess proportion, d, of lithium, have a combined average oxidation state of +3.5; wherein the LiM"O$_4$ component comprises a spinel crystal lattice structure; the LiM'O$_2$ component thereof comprises a layered crystal lattice structures; and at least one of M' and M" comprises Co. In some embodiments of the layered-spinel composite, 0.85≤y<1; wherein 0.9≤y<1, or 0.85<y≤0.9.

In some embodiments of the layered-spinel material, each of M' comprises at least one metal selected from the group consisting of Mn, Ni, and Co; and M" comprises at least one metal selected from the group consisting of Ni and Co. Optionally, M' further comprises at least one metal selected from the group consisting of Al, Mg, Li, and a first or second row transition metal other than Mn, Ni and Co; and M" further comprises at least one metal selected from the group consisting of Al, Mg, and a first or second row transition metal other than Mn, Ni and Co.

In some embodiments of the layered-spinel material, 0<d≤0.2; 0.2<z≤0.6; and M" comprises Ni, Co, or a combination thereof.

In some other embodiments of the layered-spinel material, M" comprises at least one metal selected from Ni and Co.

In some other embodiments of the layered-spinel material, M' comprises Mn and Ni, or Mn, Ni and Co.

In some embodiments of the layered-spinel material, the spinel component, Li$_{1+d}$Mn$_{2-z-d}$M"$_z$O$_4$, comprises Mn, Ni, and Co. For example, M' comprises Mn and Ni; and the spinel component, Li$_{1+d}$Mn$_{2-z-d}$M"$_z$O$_4$, comprises Mn, Ni, and Co.

In some other embodiments of the layered-spinel material, M" comprises at least one metal selected from the group consisting of Ni and Co; d>0; and 2−d−z>0.

In one preferred embodiment of the layered-spinel material, M" comprises Ni and Co; Co constitutes about 1 atom percent to about 30 atom percent of transition metals in spinel component, Li$_{1+d}$Mn$_{2-z-d}$M"$_z$O$_4$; and the combination of Mn and Ni constitutes about 70 atom percent to about 99 atom percent of the transition metals in the spinel component. For example, the combination of Mn and Ni can constitute about 80 atom percent of the transition metals in the spinel component, and Co can constitute about 20 atom percent of the transition metals in the spinel component. Alternatively, the spinel component can constitute about 50 atom percent Mn, about 30 atom percent Ni, and about 20 atom percent Co of the transition metals in the spinel component.

The Li, Mn, M' and M" cations of the layered-spinel material can be partially disordered over the octahedral and tetrahedral sites of the layered and spinel components of the composite lithium metal oxide structure.

In another aspect, the present invention provides a positive electrode for a lithium electrochemical cell comprising layered-layered-spinel and/or layered-spinel electrode material, preferably in contact with a metal current collector. If, desired, the layered-layered-spinel and/or layered-spinel materials can be formulated with another active electrode material, such as carbon. The electrode is useful as a positive electrode in lithium electrochemical cells and batteries.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

FIG. 8 provides plots of voltage versus capacity (Panel A) and normalized capacity (Panel B) for samples of 0.5Li$_2$MnO$_3$.0.5LiCoO$_2$ prepared at temperatures ranging from 400 to 900° C.

FIG. 9 provides plots of first cycle charge capacity, discharge capacity, and efficiency for samples using a layered-layered template, i.e., a pristine layered-layered 0.1Li$_2$MnO$_3$.0.9LiMn$_{0.4}$Ni$_{0.55}$Co$_{0.05}$O$_2$ composition, an acid-treated pristine sample with additional Co annealed at 450° C. for three hours, and an acid-treated pristine sample with additional Co annealed at 750° C. for six hours.

FIG. 10 provides plots of voltage versus capacity for selected acid-treated $0.1Li_2MnO_3.0.9LiMn_{0.4}Ni_{0.55}Co_{0.05}O_2$ materials.

DETAILED DESCRIPTION OF PREFERRED EMBODIMENTS

This invention relates to cobalt-stabilized lithium-metal oxide electrodes that fall within the scope of structurally compatible, composite 'layered-layered' and 'layered-spinel' materials that contain a layered $Li_2MnO_3$ component. Selected compositions of these materials have been discovered that appear to arrest a voltage fade phenomenon which occurs when state-of-the-art 'layered-layered' and 'layered-spinel' electrode materials are repeatedly cycled in lithium cells. The preferred precursor compound for synthesizing the improved compounds and compositions of the invention comprises $Li_2MnO_3$ (or in conventional layered notation $Li[Li_{1/3}Mn_{2/3}]O_2$).

Figure 1:
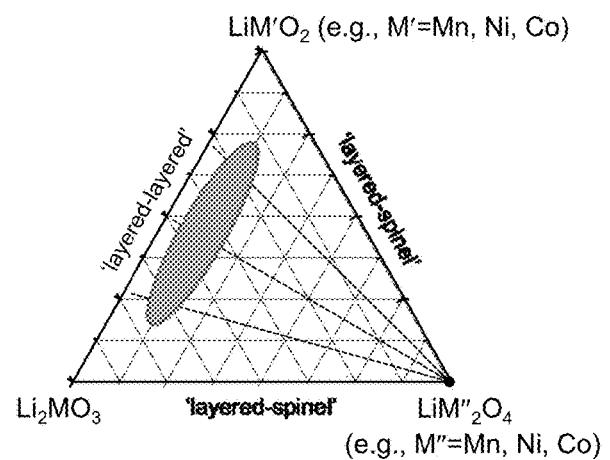
FIG. 1 depicts a Li$_2$MO$_3$-LiM'O$_2$—LiM"$_2$O$_4$ phase diagram, in which Li$_2$MO$_3$, LiM'O$_2$, and Li$_{1+d}$Mn$_{2-z-d}$ M"$_z$O$_4$ (represented for simplicity as LiM"$_2$O$_4$, i.e., where d is 0 and M" includes the Mn portion of the spinel) are the layered, layered, and spinel components of a layered-layered-spinel electrode material.

Broadly speaking, it has been discovered that the voltage fade of high-capacity 'layered-layered' $xLi_2MnO_3.(1-x)LiMO_2$ electrodes, in which M is a metal cation is comprised, typically of Mn, Ni and Co, can be suppressed by introducing a spinel component into the 'layered-layered' structure by careful selection and control of the $Li_2MnO_3$ and Co content and overall composition of the resulting 'layered-layered-spinel' products. In a general embodiment, the materials of the invention can be defined on a 'layered-layered-spinel' $Li_2MO_3$—$LiM'O_2$—$LiM''_2O_4$ phase diagram, shown schematically in FIG. 1, in which $Li_2MO_3$, $LiM'O_2$, and $Li_{1+d}Mn_{2-z-d}M''_zO_4$ (represented in the diagram as $LiM''_2O_4$, for simplicity, i.e., where d is 0 and M'' includes the Mn portion of the spinel) are the layered, layered, and spinel components, respectively, that described the overall composition of the electrode within the $Li_2MO_3$-$LiM'O_2$—$LiM''_2O_4$ phase diagram; and where M is one or more metal cations with a combined average tetravalent oxidation state, preferably $Mn^{4+}$; M' is one or more metal cations with a combined average trivalent oxidation state, preferably comprising manganese, nickel and cobalt ions, and M'' comprises one or more metal cations with a combined average oxidation state of between +3.5 and +4.0, preferably comprising manganese, nickel and cobalt ions, optionally with lithium ions. For example, the average oxidation state of a $Li_{1+d}Mn_{2-z-d}M''_zO_4$ component in which d=0 and z=0 would be +3.5, whereas for d=0.333 and z=0 (i.e., $Li_{1.333}Mn_{1.667}O_4$), it would be +4.0.

The composite 'layered-layered-spinel' electrode structures and materials of this invention (which can, in general, be regarded overall as a composite structure with both layered and spinel character), have the advantage of providing a voltage profile with both the sloping character of the layered components and the voltage plateaus of the spinel components, thus smoothing the overall voltage profile of high capacity, structurally-integrated, 'composite' layered-spinel electrodes of this invention. The spinel electrode materials of this invention are broad in compositional scope and structure. In an ideal $LiM''_2O_4$ spinel structure, the metal cations are distributed in octahedral sites in alternating close-packed oxygen layers in a 3:1 ratio of transition metals to Li, whereas, in an ideal $LiM'O_2$ layered structure, the M' transition metal cations occupy all the octahedral sites in alternating layers, without any Li being present in those layers. Therefore, in the composite layered-spinel structures of this invention, the ratio of metal cations in alternating layers of the close-packed oxygen array can vary within the structure from the 3:1 transition metal to Li ratio of an ideal spinel configuration to the corresponding ideal layered configuration with no lithium in the transition metal layers. Furthermore, the Li, Mn, M, M' and M'' cations of the spinel and layered electrode materials of this invention can be partially disordered over the octahedral and tetrahedral sites of the layered and spinel components of the composite $y[xLi_2MO_3.(1-x)LiM'O_2].(1-y)Li_{1+d}Mn_{2-z-d}M''_zO_4$ lithium metal oxide structure, yielding complex cation arrangements in the spinel and layered components and in the overall and highly complex 'layered-layered-spinel' composite structures. In some instances, the structural complexity of the electrodes of the invention makes it difficult to distinguish the individual components from one another, particularly when the intergrown layered $Li_2MO_3$ and $LiM'O_2$ components are disordered within a single, structurally-compatible close-packed oxide array, in which case the electrode composition can be simply regarded as, and represented, by a 'layered-spinel' structure.

Figure 2:
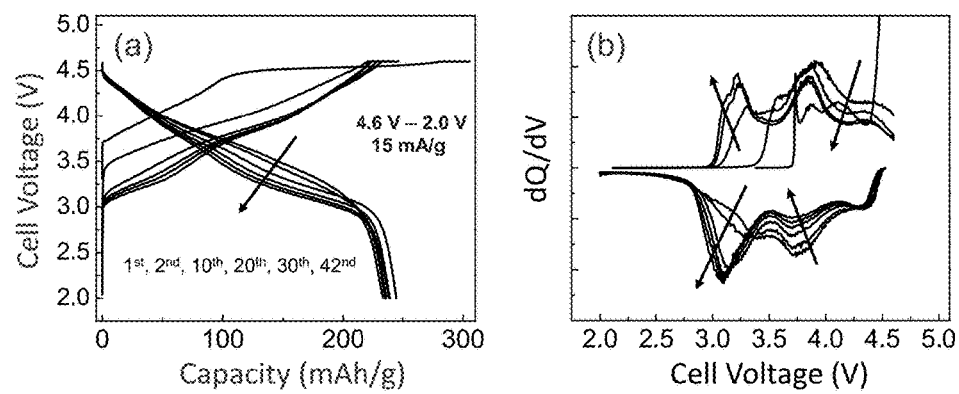
FIG. 2 depicts (a) the electrochemical cycling behavior and voltage fade and (b) corresponding dQ/dV plots of a 'layered-layered' 0.5Li$_2$MnO$_3$.0.5LiMn$_{0.5}$Ni$_{0.5}$O$_2$ electrode in a lithium half-cell, charged and discharged between 4.6 and 2.0 V.
Figure 3:
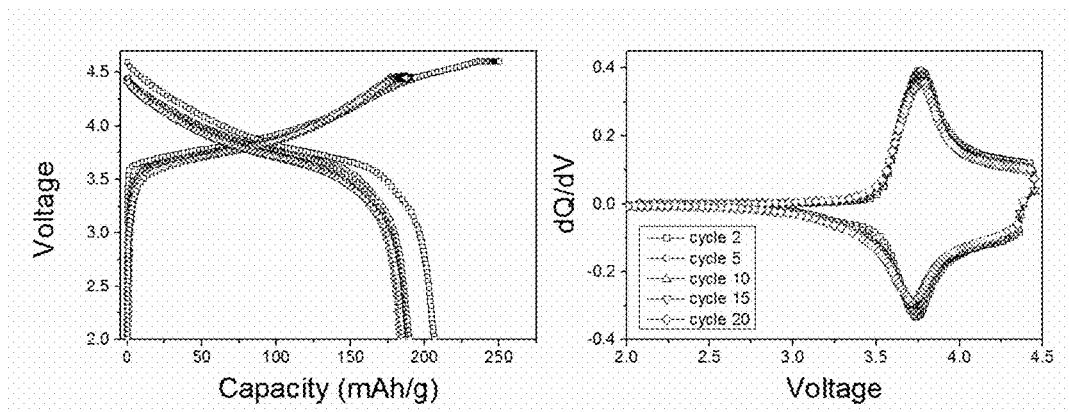
FIG. 3 depicts (a) the electrochemical cycling behavior and (b) corresponding dQ/dV plots of a 'layered-layered-spinel' electrode of this invention derived from a lithium-deficient 0.25Li$_2$MnO$_3$.0.75LiMn$_{0.375}$Ni$_{0.375}$Co$_{0.25}$O$_2$ composition to generate 15% spinel in the composite structure.

The principles of the invention are embodied in FIG. 2 and FIG. 3. FIG. 2, panel (a), shows the electrochemical cycling behavior and voltage fade of a typical 'layered-layered' $0.5Li_2MnO_3.0.5LiMn_{0.5}Ni_{0.5}O_2$ electrode in a lithium half-cell, when the cells are charged and discharged continuously between 4.6 and 2.0 V. FIG. 2, panel (b), shows the corresponding dQ/dV plots of the data in panel (a). These data clearly highlight the electrochemical and concomitant structural decay of the $xLi_2MnO_3.(1-x)LiMO_2$ electrode that leads to energy loss and inefficiency of the lithium cell on repeated cycling.

The electrochemical and corresponding dQ/dV plots of an advanced 'layered-layered-spinel' electrode of this invention derived from a lithium-deficient $0.25Li_2MnO_3.0.75LiMn_{0.375}Ni_{0.375}Co_{0.25}O_2$ precursor to generate 15% spinel in the composite structure are shown in FIG. 3, panels (a) and (b), respectively. This electrode was activated by an initial charge/discharge cycle between 4.6 and 2.0 V and then subsequently charged and discharged between 4.45 and 2.0 V. The voltage profiles (FIG. 3, panel (a)) and corresponding dQ/dV plots (FIG. 3, panel (b)) indicate remarkable cycling stability relative to those in FIG. 2 without any significant redox process occurring below 3.5 V, while still generating between 180 and 200 mAh/g for twenty cycles. This surprisingly improved performance is attributed to the spinel component within the composite structure, notably cobalt-rich spinel components, $LiM_2O_4$, in which M is predominantly Co and Ni relative to Mn and Li. In this respect, it is to be noted that a Li[Co$_2$]O$_4$ spinel is known to accommodate lithium at approximately 3.4 V, which emphasizes the advantage of using a cobalt or cobalt-substituted Li[Co$_{2-x}$M$_x$]O$_4$ spinel to stabilize the cycling performance of 'layered-layered' electrodes.

Similarly, in a preferred embodiment of the invention, when x=0, the 'layered-spinel' yLiM'O$_2$.(1-y)Li$_{1+d}$Mn$_{2-z-d}$M"$_z$O$_4$ electrode structure has a composition in which M" comprises at least one metal selected from the group consisting of Ni, and Co.

The electrode compositions and structures of this invention can be synthesized by using Li$_2$MnO$_3$ as a precursor and reacting it with the required amount of Ni and Co in solution followed by a heat-treatment step, as described by Croy et al., in *Electrochemistry Communications*, Volume 13, pages 1063-1066 (2011). For example, a 'layered-layered' product with a targeted composition 0.25Li$_2$MnO$_3$.0.75LiMn$_{0.375}$Ni$_{0.375}$Co$_{0.25}$O$_2$ can be prepared by reacting a Li$_2$MnO$_3$ precursor with the stoichiometrically-required amounts of nickel and cobalt nitrates in a 0.1 M solution of HNO$_3$, and then stirring the mixture overnight at room temperature. Thereafter, the liquid from the solution is evaporated at approximately 70° C., and the resulting solid product collected and ground to a powder. The powder is then annealed at about 850° C. for about 24 hours in air. Variations in synthesis parameters, e.g., temperature, dwell times, rates of cooling, etc., can be used to optimize the structures and electrochemical properties of the materials of this invention for a given application or use. In order to synthesize 'layered-layered-spinel' products of this invention, the same procedure is followed, as described above, but using a smaller amount of lithium than is required for the 'layered-layered' composition, which drives the composition of the final product toward the LiM"$_2$O$_4$ spinel apex of the phase diagram in FIG. 1, thereby resulting in the 'layered-layered-spinel' products. Alternatively, the compositions of the advanced materials of this invention can be synthesized by other processing methods that are known in the art, for example, by sol-gel and precipitation processing techniques using precursors that decompose during synthesis, such as metal hydroxides, carbonates and oxalates, or by solid state reactions, thereby broadening the scope of this invention.

In a particular embodiment of the invention, the Co content in the y[xLi$_2$MO$_3$.(1-x)LiM'O$_2$].(1-y)Li$_{1+d}$Mn$_{2-z-d}$M"$_z$O$_4$ electrode comprises more than 50% of the combined M, M', and M" content. Alternatively, the Co content can comprise less than 50% of the combined M, M', and M" content. In yet another embodiment, the Ni content in the y[xLi$_2$MO$_3$.(1-x)LiM'O$_2$].(1-y)Li$_{1+d}$Mn$_{2-z-d}$M"$_z$O$_4$ electrode can comprise more than 50% of the combined M, M', and M" content, for example, 60%, 70%, 80% or 90%.

Specific examples of the processing methods that were employed to synthesize the electrodes of this invention are:
1. (NiMnCo)C$_2$O$_4$ (i.e., metal oxalate) precursors were prepared from NiSO$_4$.6H$_2$O, MnSO$_4$.H$_2$O, CoSO$_4$.7H$_2$O, and Na$_2$C$_2$O$_4$ using the required ratios of Ni, Mn and Co for a targeted stoichiometry in the final product (the 'oxalate method'). An aqueous solution containing the required stoichiometric amounts of metal sulfates was added under stirring into a solution of sodium oxalate. The solution was then stirred for about 3 hours at about 70° C. The co-precipitated powder was filtered, washed, and dried in air at about 105° C. The dried powders were thoroughly mixed with stoichiometric amounts of lithium carbonate and annealed at about 450° C. for about 12 hours in air, followed by grinding and an annealing step at about 750° C. for about 12 hours (also in air) to prepare materials with a desired composition. Other annealing conditions included no intermediate firing step, different annealing times and different temperatures.
2. Materials from Li$_2$MnO$_3$ precursors were prepared by the following procedure: Li$_2$MnO$_3$ was added under stirring into a 0.1 M HNO$_3$ solution at room temperature (the 'Li$_2$MnO$_3$ method'). The required amounts of Ni(NO$_3$)$_2$.6H$_2$O, Co(NO$_3$)$_2$.6H$_2$O, and LiNO$_3$ for a desired stoichiometry in the final product were added to the solution and subsequently stirred overnight. The solution was then heated to dryness at approximately 80° C., then the solid product was ground and annealed in air at about 850° C. for about 24 hours.

Figure 4:
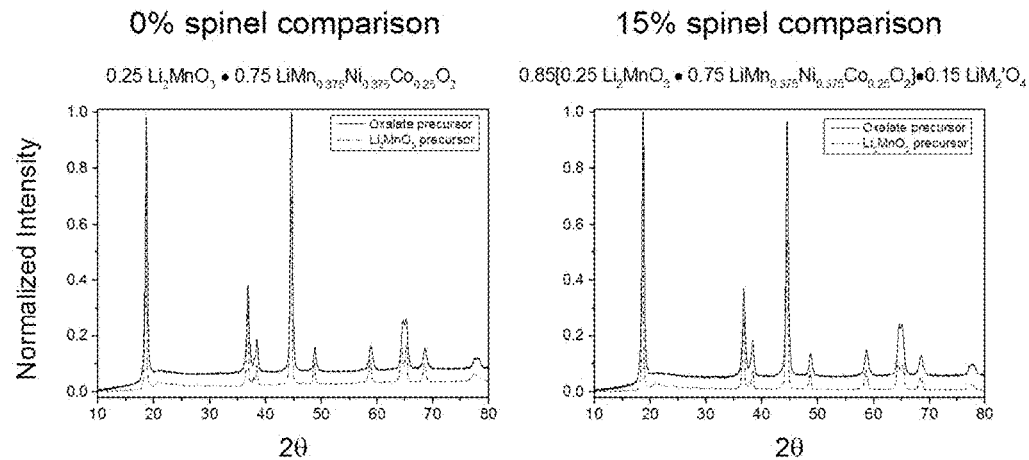
FIG. 4 depicts the X-ray diffraction patterns of (left) 'layered-layered' 0.25Li$_2$MnO$_3$.0.75 LiMn$_{0.375}$Ni$_{0.375}$ Co$_{0.25}$O$_2$ products when synthesized from a metal oxalate and Li$_2$MnO$_3$ precursors, and (right) layered-layered spinel products synthesized from lithium-deficient compositions of 0.25Li$_2$MnO$_3$.0.75LiMn$_{0.375}$Ni$_{0.375}$ Co$_{0.25}$O$_2$.
Figure 5:
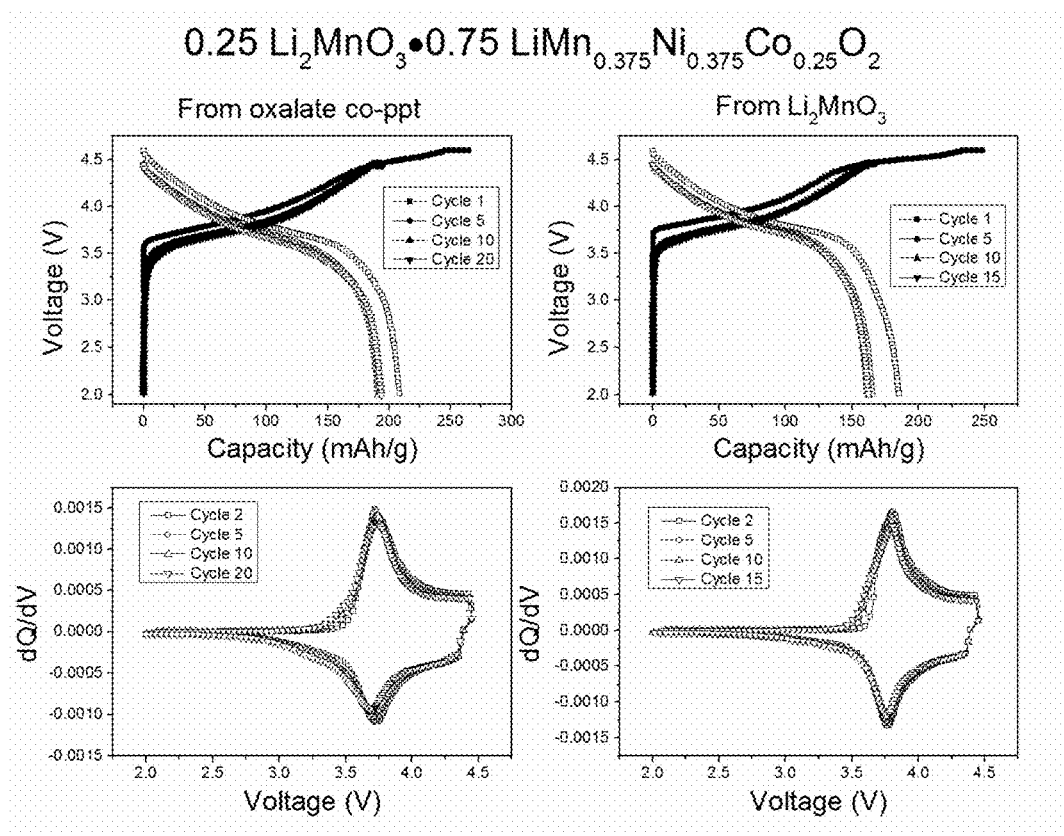
FIG. 5 depicts (top) the electrochemical profiles of lithium half cells in which the 0.25Li$_2$MnO$_3$.0.75 LiMn$_{0.375}$Ni$_{0.375}$ Co$_{0.25}$O$_2$ cathode was prepared from (left) oxalate and (right) Li$_2$MnO$_3$ precursors, the cells being charged and discharged between 4.45 and 2.0 V, after an initial activation charge to 4.6 V, at 15 mA/g.
Figure 6:
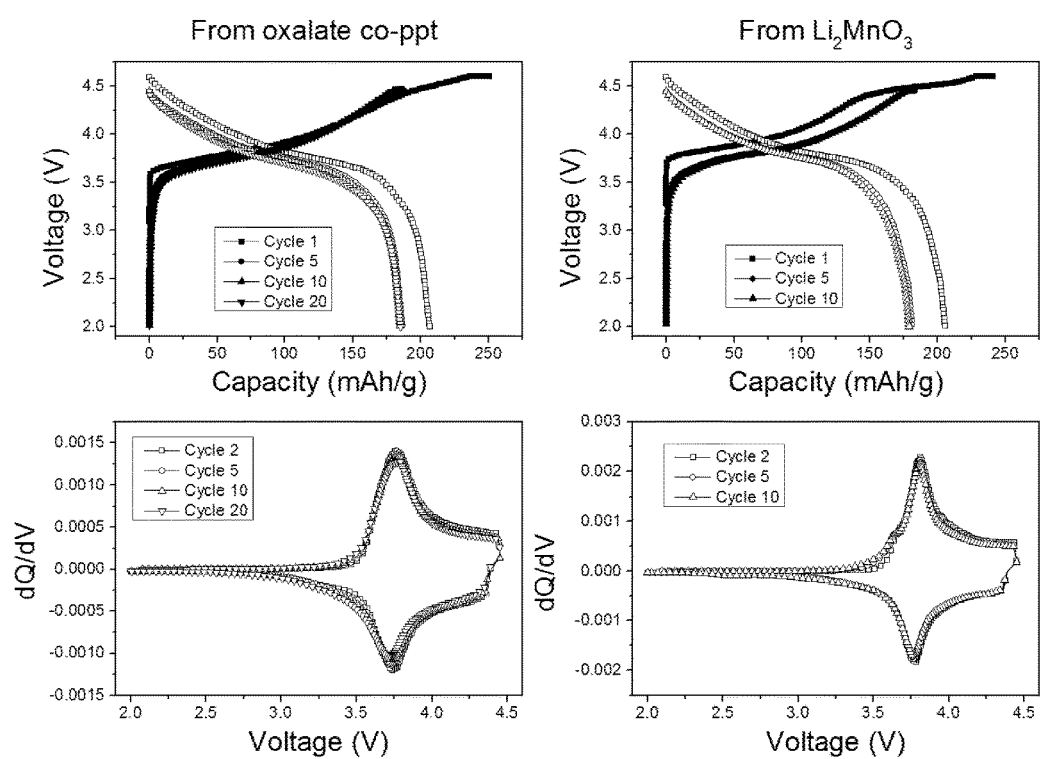
FIG. 6 depicts (top) the electrochemical profiles of lithium half cells in which the 'layered-layered-spinel' cathode with 15% spinel was derived from a 0.25Li$_2$MnO$_3$.0.75LiMn$_{0.375}$Ni$_{0.375}$ Co$_{0.25}$O$_2$ composition prepared from (left) oxalate and (right) Li$_2$MnO$_3$ precursors, the cells being charged and discharged between 4.45 and 2.0 V, after an initial activation charge to 4.6 V, at 15 mA/g.

The versatility in synthesizing the 'layered-layered-spinel' electrode materials of this invention are demonstrated in FIGS. 4 to 6 by methods using (1) metal oxide precursors and (2) a Li$_2$MnO$_3$ template into which the required metal cations and oxygen are introduced to create the composite structures as described by Croy et al., in *Electrochemistry Communications*, Volume 13, pages 1063-1066 (2011).

For example, FIG. 4 (left) shows the powder X-ray diffraction patterns (CuKα radiation) of a 'layered-layered' 0.25Li$_2$MnO$_3$.0.75LiMn$_{0.375}$Ni$_{0.375}$Co$_{0.25}$O$_2$ composition (i.e., targeting 0% spinel in the structure) using manganese, nickel and cobalt oxalate precursors and the same composition using a Li$_2$MnO$_3$ template for comparison; FIG. 4 (right) shows the powder X-ray diffraction patterns of a 'layered-layered-spinel' product with 15% spinel derived from 0.25Li$_2$MnO$_3$.0.75LiMn$_{0.375}$Ni$_{0.375}$Co$_{0.25}$O$_2$ by reducing the lithium content in the starting precursors by 9%. These X-ray diffraction patterns are similar, highlighting the difficulty in differentiating the 'layered-layered' structures from 'layered-layered-spinel' derivatives by routine X-ray diffraction methods.

Cathodes for the electrochemical tests were prepared by coating Al foil with a slurry containing 82 percent by weight (wt %) of the oxide powder, 8 wt % SUPER P carbon (TIMCAL Ltd.), and 10 wt % polyvinylidene difluoride (PVDF) binder in NMP and assembled in coin cells (size 2032). The cells contained a metallic lithium anode. The electrolyte was a 1.2 M solution of LiPF$_6$ in a 3:7 mixture of ethylene carbonate (EC) and ethyl methyl carbonate (EMC). Coin cells were assembled in a glovebox under an inert argon atmosphere.

FIG. 5 shows (top, left and right) the electrochemical cycling profiles and (bottom) the corresponding dQ/dV plots of Li/0.25Li$_2$MnO$_3$.0.75LiMn$_{0.375}$Ni$_{0.375}$Co$_{0.25}$O$_2$ cells, in which the cathode was synthesized by the oxalate and Li$_2$MnO$_3$ methods, respectively, when cycled between 4.45 and 2.0 V after an initial activation charge to 4.6 V. Both cells show exceptional stability over this voltage range with insignificant voltage fade relative to the data of the 'layered-layered' 0.5Li$_2$MnO$_3$.0.5LiMn$_{0.5}$Ni$_{0.5}$O$_2$ electrode shown in FIG. 2.

FIG. 6 shows (top, left and right) the electrochemical cycling profiles and (bottom) the corresponding dQ/dV plots of lithium cells in which the 'layered-layered-spinel' cathode, when synthesized by the oxalate and Li$_2$MnO$_3$ methods, respectively, was derived from a 0.25Li$_2$MnO$_3$.0.75LiMn$_{0.375}$Ni$_{0.375}$Co$_{0.25}$O$_2$ composition by reducing the lithium in the composition by 9%, when cycled between 4.45 and 2.0 V after an initial activation charge to 4.6 V. Both cells cycled with exceptional stability over this voltage range, delivering a steady capacity between 180 and 190 mAh/g at an average voltage of approximately 3.54 V with insignificant voltage fade relative to the data of the 'layered-layered' $0.5Li_2MnO_3 \cdot 0.5LiMn_{0.5}Ni_{0.5}O_2$ electrode shown in FIG. 2.

Figure 7:
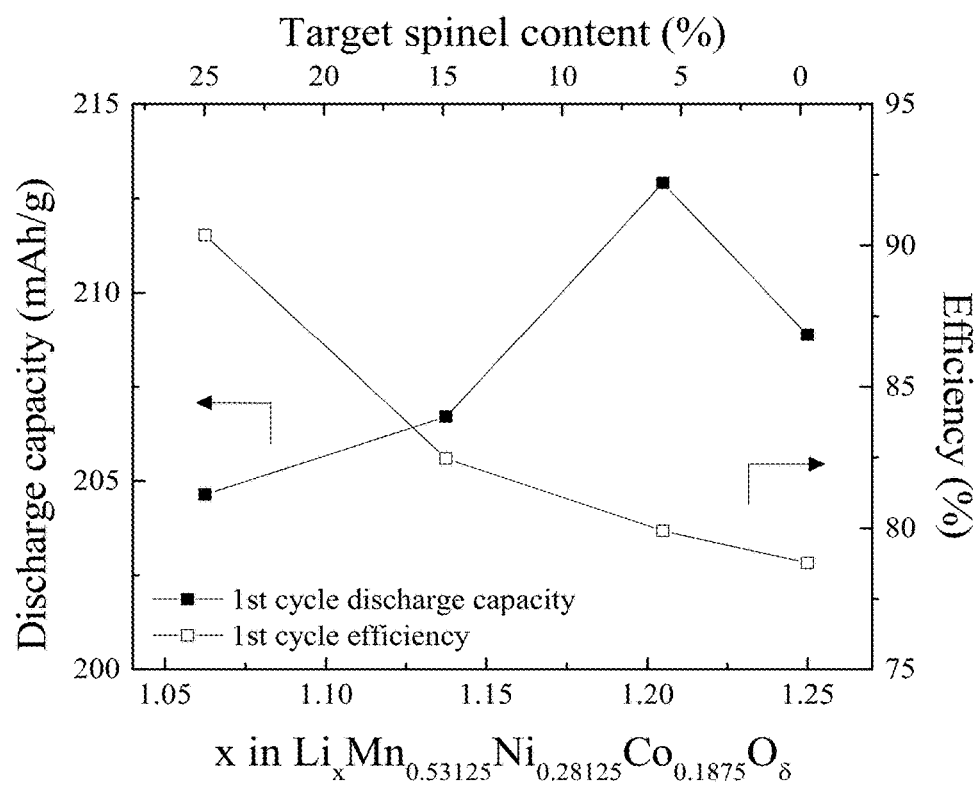
FIG. 7 depicts the first-cycle discharge capacity (■) and first-cycle efficiency (□) as a function of cathode composition, x, in Li$_x$Mn$_{0.53125}$Ni$_{0.28125}$Co$_{0.18750}$O$_6$ and the corresponding target spinel content as a percentage in the 'layered-layered-spinel' cathode.

A series of 'layered-layered-spinel' electrode compositions with varying spinel content, synthesized by the 'oxalate method', was investigated electrochemically. For one experiment, electrodes were prepared by using less lithium than would normally be used for synthesizing a 'layered-layered' electrode of nominal composition $0.25Li_2MnO_3 \cdot 0.75 LiMn_{0.375}Ni_{0.375}Co_{0.250}O_2$ in which the Mn:Ni:Co ratio is 0.53125:0.28125:0.18750; this 'layered-layered-spinel' electrode is normalized to read '$Li_xMn_{0.53125}Ni_{0.28125}Co_{0.18750}O_\delta$' for convenience and simplicity, with the value of x=1.25 and δ=2.25 representing the parent 'layered-layered' composition $0.25Li_2MnO_3 \cdot 0.75LiMn_{0.375}Ni_{0.375}Co_{0.250}O_2$. A plot of first-cycle capacity and first-cycle efficiency vs. lithium (spinel) content of a lithium cell containing the '$Li_xMn_{0.53125}Ni_{0.28125}Co_{0.18750}O_\delta$' electrode is shown in FIG. 7. The top x-axis shows the increasing target spinel content as a function of decreasing lithium content. The electrodes were first charged to 4.6 V and discharged to 2.0 V in lithium coin cells. The plot of solid squares indicates that the electrode capacity reaches a maximum by lowering the lithium content corresponding to spinel content of approximately 6%, after which the electrode capacity decreases, in accordance with a significant advantage of the layered-layered-spinel electrodes of this invention over conventional layered-layered electrodes. Lowering the lithium content, thereby increasing the spinel content, also has the significant advantage of increasing the first-cycle efficiency of the cell (open squares).

The invention extends to include lithium metal oxide electrode materials (e.g., lithium-rich spinels, layered oxides, and the like) with surface modification, for example, with metal-oxide, metal-fluoride or metal-phosphate layers or coatings to protect the electrode materials from highly oxidizing potentials in the cells and from other undesirable effects, such as electrolyte oxidation, oxygen loss, and/or dissolution. Such surface protection enhances the surface stability, rate capability and cycling stability of the electrode materials.

In some embodiments, individual particles of a powdered lithium metal oxide composition, a surface of the formed electrode, or both, are coated or treated, e.g., in situ during synthesis, for example, with a metal oxide, a metal fluoride, a metal polyanionic material, or a combination thereof, e.g., at least one material selected from the group consisting of (a) lithium fluoride, (b) aluminum fluoride, (c) a lithium-metal-oxide in which the metal is selected preferably, but not exclusively, from the group consisting of Al and Zr, (d) a lithium-metal-phosphate in which the metal is selected from the group consisting preferably, but not exclusively, of Fe, Mn, Co, and Ni, and (e) a lithium-metal-silicate in which the metal is selected from the group consisting preferably, but not exclusively, of Al and Zr. In a preferred embodiment of the invention, the constituents of the treatment or coating, such as the aluminum and fluoride ions of an $AlF_3$ coating, the lithium and phosphate ions of a lithium phosphate coating, or the lithium, nickel and phosphate ions of a lithium-nickel-phosphate coating can be incorporated in a solution that is contacted with the hydrogen-lithium-manganese-oxide material or the lithium-manganese-oxide precursor when forming the electrodes of this invention. Alternatively, the surface may be treated with fluoride ions, for example, using $NH_4F$, in which case, the fluoride ions may substitute for oxygen at the surface or at least partially within the bulk of the electrode structure.

Preferably, a formed positive electrode comprises at least about 50 percent by weight (wt %) of a powdered lithium metal oxide composition comprising the lithium-rich spinel material, and an electrochemically inert polymeric binder (e.g., polyvinylidene difluoride; PVDF). Optionally, the positive electrode can comprise up to about 40 wt % carbon (e.g., carbon back, graphite, carbon nanotubes, carbon microspheres, carbon nanospheres, or any other form of particulate carbon).

In another example, the data in FIG. 8, Panel A, show the first cycle voltage profiles when cycled between 4.6 and 2 V at 15 mA/g for $0.5Li_2MnO_3 \cdot 0.5LiCoO_2$ compositions made at temperatures in the range of 400 to 900° C. The incorporation of a "low-temperature" $LiCoO_2$ lithiated spinel component (i.e., $Li_2[Co_2]O_4$) into a layered-layered composite structure (i.e., control of stabilizing Co in the Li layer) is evident in the 400° C. and 500° C. samples, which exhibited a 3.4 V plateau. Above these temperatures, it appears that the Co migrates into the transition metal layer to induce greater layered character to the electrode. FIG. 8, Panel B, shows the normalized first cycle discharge voltage profile which clearly illustrates the presence of the 3.4 V plateau.

In another embodiment, the Co can be introduced into a series of layered Ni/Mn/Co and layered-layered compositions with increasing Li content (i.e., increasing 'layered-layered' character). The material prepared at lower synthesis temperature showed an increase in 3.4 V plateau capacity associated with stabilizing Co in the Li layer in a Ni containing oxide.

The compositions and structures of this invention can be synthesized by various processing methods, such as acid treatment of a layered, two-component, layered-layered material, or a three-component, layered-layered-spinel template or precursor as described by Croy et. al., in *Electrochemistry Communications*, Volume 13, pages 1063-1066 (2011). For example, FIG. 9 shows the first cycle charge capacity, discharge capacity, and efficiency for samples using a layered-layered template: (1) a pristine layered-layered $0.1Li_2MnO_3 \cdot 0.9LiMn_{0.4}Ni_{0.55}Co_{0.05}O_2$ composition, (2) an acid treated pristine sample with additional Co annealed at 450° C. for three hours, and (3) an acid treated pristine sample with additional Co annealed at 750° C. for six hours. All three samples deliver approximately 200 to 205 mAh/g first cycle discharge capacity when cycled between 4.6 and 2 V at 15 mA/g. The addition of stabilizing Co at low temperatures improved the first cycle efficiency without sacrificing discharge capacity.

FIG. 10 shows the first cycle voltage profiles for the samples from FIG. 9 plus additional acid treated samples with additional (50%) Co. The acid treatment process did not remove significant Li content, as evidenced by the similar discharge capacity for all samples. The lower temperature samples (450° C.) exhibited a 3.4 V plateau attributed to stabilizing Co in the Li layer, whereas the higher temperature sample (750° C.) did not. A significant advantage of having cobalt in the lithium layer is that it can impart the characteristic discharge voltage of a $LiCo_2O_4$ spinel at 3.4 V, which can be used as an end-of-discharge indicator for the electrodes of this invention. By analogy, the invention can be extended to include electrodes that contain, for example, a $LiNi_2O_4$ spinel component, stabilized by the layered component of the composite structure, which is believed would provide an elevated discharge voltage relative to $LiMn_2O_4$ (~2.9 V), similar to a $LiCo_2O_4$ spinel, or a material such as $LiCo_{2-x}Ni_xO_4$, $LiCo_{2-x-y}Ni_x Mn_yO_4$, and the like.

In another example, a metal oxalate precursor with the composition $(Ni_{0.5625}Mn_{0.34375}Co_{0.09375})C_2O_4$ was prepared according to Method 1, described earlier, from $NiSO_4 \cdot 6H_2O$, $MnSO_4 \cdot H_2O$, $CoSO_4 \cdot 7H_2O$, and $H_2C_2O_4$ using the required ratios of Ni, Mn and Co for the targeted stoichiometry in the final product. The dried powders were thoroughly mixed with stoichiometric amounts of lithium carbonate and annealed at about 850° C. for about 24 hours in air to prepare materials with a composition corresponding to a 'layered-layered' composition, $0.25Li_2MnO_3 \cdot 0.75LiMn_{0.125}Co_{0.125}Ni_{0.75}O_2$ and to a 'layered-layered-spinel' composition targeting 15% spinel, i.e., $0.85[0.25Li_2MnO_3 \cdot 0.75LiMn_{0.125}Co_{0.125}Ni_{0.75}O_2]$ $\cdot 0.15LiM''_2O_4$. The Ni to (Co+Mn) ratio in this electrode is approximately 56:44, i.e., the Ni content comprises more than 50% of the combined M, M', and M'' content, in accordance with one embodiment of the invention. Cathodes for the electrochemical tests were prepared and evaluated in coin cells as described earlier; for these experiments, the Al foil current collector was coated with a slurry containing 84 percent by weight (wt %) of the oxide powder, 8 wt % SUPER P carbon (TIMCAL Ltd.), and 8 wt % polyvinylidene difluoride (PVDF) binder in NMP.

Figure 11:
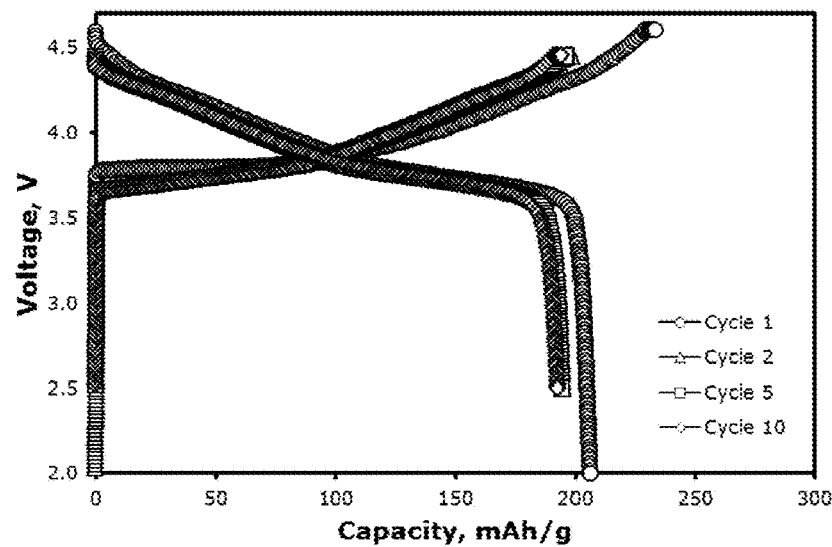
FIG. 11 shows the electrochemical charge/discharge profiles for the $1^{st}$, $2^{nd}$, $5^{th}$, and $10^{th}$ cycles of a $Li/0.25Li_2MnO_3.0.75LiMn_{0.125}Co_{0.125}Ni_{0.75}O_2$ ('layered-layered') half-cell.
Figure 12:
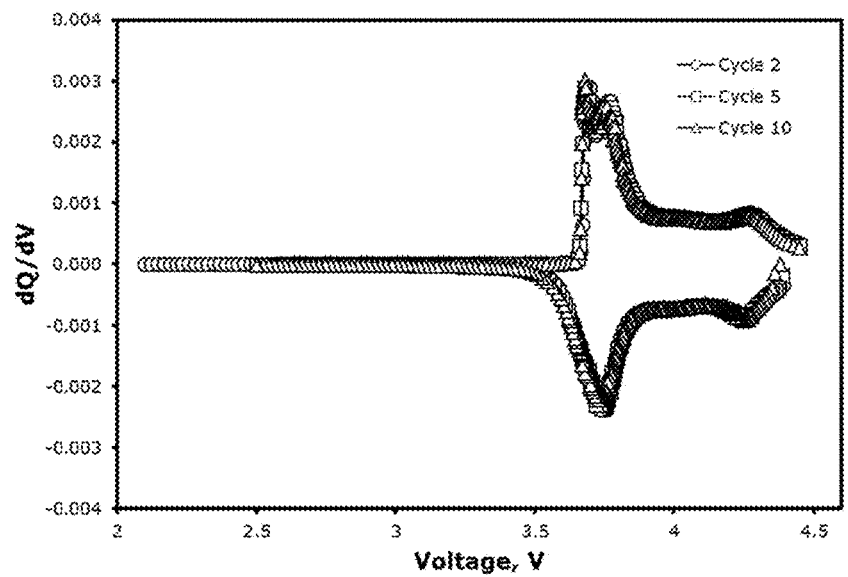
FIG. 12 shows the corresponding dQ/dV plots for the $2^{nd}$, $5^{th}$ and $10^{th}$ cycles for the cell of FIG. 11.
Figure 13:
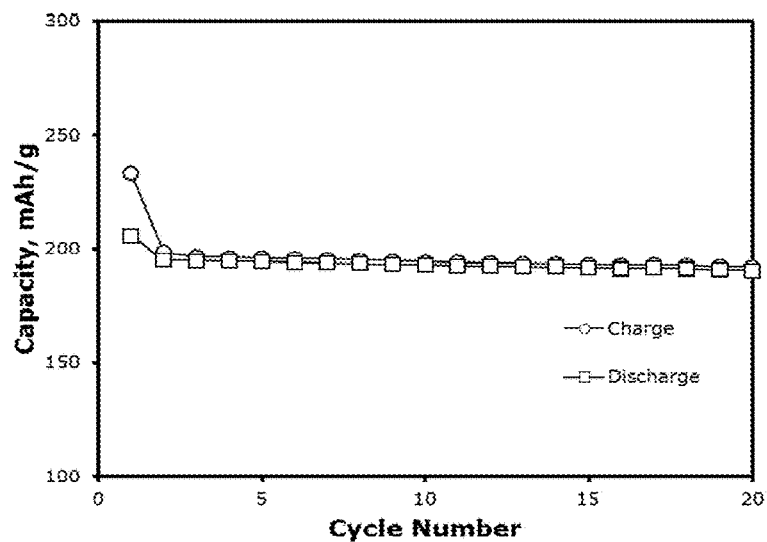
FIG. 13 shows the capacity vs. cycle number plots for the first 20 charge/discharge cycles of the cell of FIG. 11.

FIG. 11 shows the electrochemical charge/discharge profiles for the $1^{st}$, $2^{nd}$, $5^{th}$, and $10^{th}$ cycles of a $Li/0.25Li_2MnO_3 \cdot 0.75LiMn_{0.125} Co_{0.125}Ni_{0.75}O_2$ ('layered-layered') half-cell. FIG. 12 shows the corresponding dQ/dV plots for the $2^{nd}$, $5^{th}$ and $10^{th}$ cycles. FIG. 13 shows the capacity vs. cycle number plots for the first 20 charge/discharge cycles of the cell.

Figure 14:
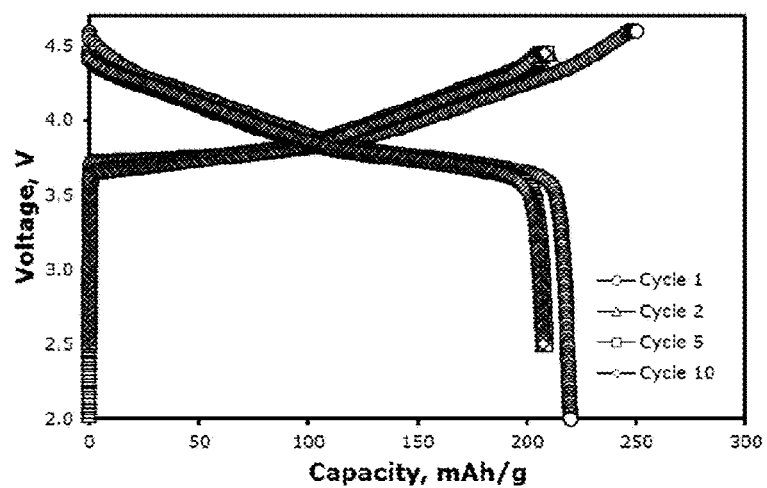
FIG. 14 depicts the electrochemical charge/discharge profiles for the $1^{st}$, $2^{nd}$, $5^{th}$, and $10^{th}$ cycles of a $Li/0.85[0.25Li_2MnO_3.0.75LiMn_{0.125}Co_{0.125}Ni_{0.75}O_2].0.15LiM''_2O_4$ ('layered-layered-spinel') half-cell.
Figure 15:
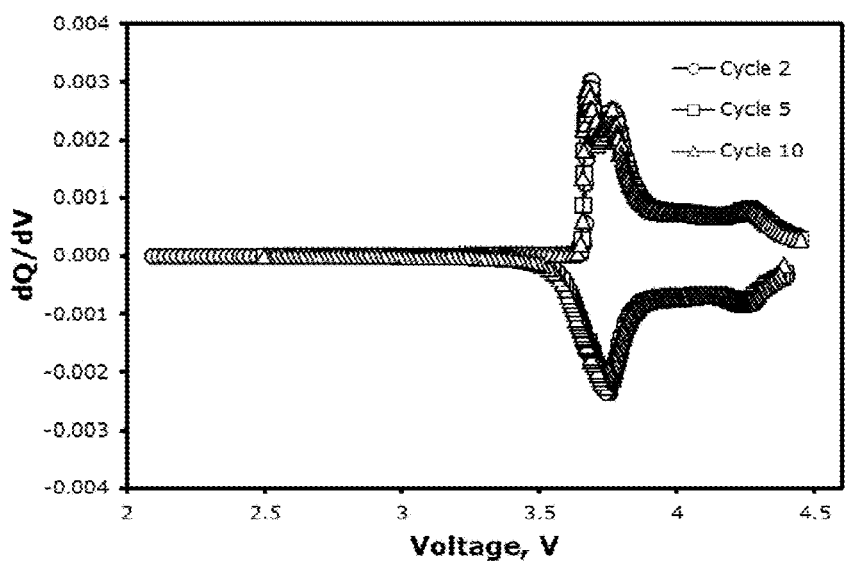
FIG. 15 shows the corresponding dQ/dV plots for the $2^{nd}$, $5^{th}$ and $10^{th}$ cycles of the cell of FIG. 14.
Figure 16:
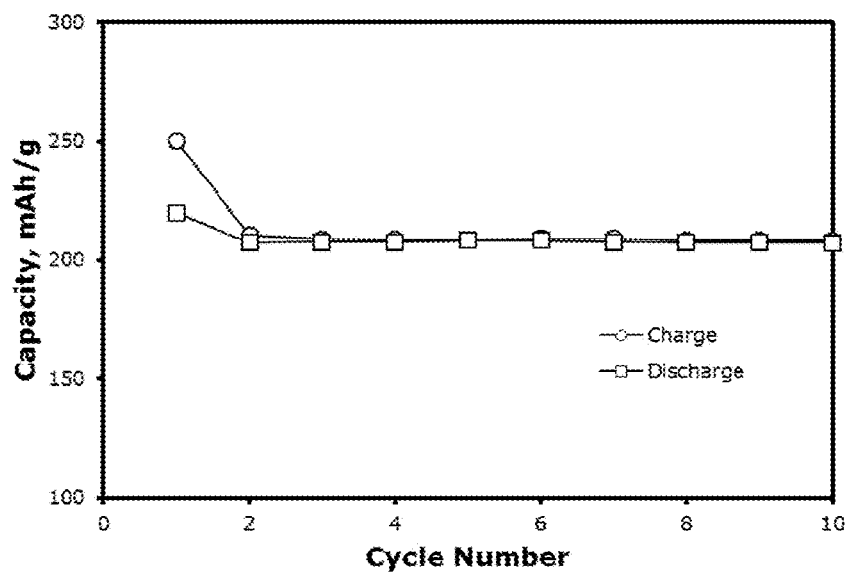
FIG. 16 depicts the capacity vs. cycle number plots for the first 10 charge/discharge cycles of the cell of FIG. 14.

FIG. 14 depicts the electrochemical charge/discharge profiles for the $1^{st}$, $2^{nd}$, $5^{th}$, and $10^{th}$ cycles of a $Li/0.85$ $[0.25Li_2MnO_3 \cdot 0.75LiMn_{0.125}Co_{0.125}Ni_{0.75}O_2]$ $\cdot 0.15LiM''_2O_4$ ('layered-layered-spinel') half-cell. FIG. 15 shows the corresponding dQ/dV plots for the $2^{nd}$, $5^{th}$ and $10^{th}$ cycles. FIG. 16 depicts the capacity vs. cycle number plots for the first 10 charge/discharge cycles of the cell.

Both cells were charged and discharged between 4.45 and 2.5 V, after an initial activation charge to 4.6 V, at 15 mA/g. These data clearly demonstrate the significantly superior electrochemical properties of the 'layered-layered-spinel' electrode, relative to the 'layered-layered' electrode in accordance with the principles of the invention. In particular, the 'layered-layered-spinel' electrode (targeting 15% spinel) delivers a capacity of 207 mAh/g after 10 cycles, which is 7.2% greater than the corresponding 193 mAh/g delivered by the 'layered-layered' (0% spinel) electrode. Moreover, the cycling stability of the 'layered-layered-spinel' electrode, as reflected by a 5.6% capacity loss over the first ten cycles of the cell, is significantly superior to that of the 'layered-layered' electrode (6.5% capacity loss) as shown in Table 1.

TABLE 1

|  | 0% spinel | 15% spinel |
| --- | --- | --- |
| $1^{st}$ cycle discharge (mAh/g) | 205.84 | 219.94 |
| $5^{th}$ cycle discharge (mAh/g) | 194.25 | 208.47 |
| $10^{th}$ cycle discharge (mAh/g) | 192.71 | 207.58 |
| $20^{th}$ cycle discharge (mAh/g) | 190.35 | N/A |

Exemplary Electrochemical Cell and Battery.

Figure 17:
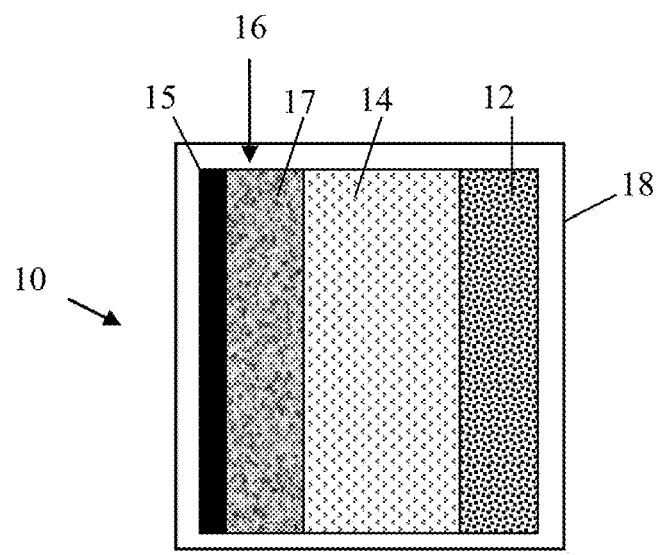
FIG. 17 depicts a schematic representation of an electrochemical cell.
Figure 18:
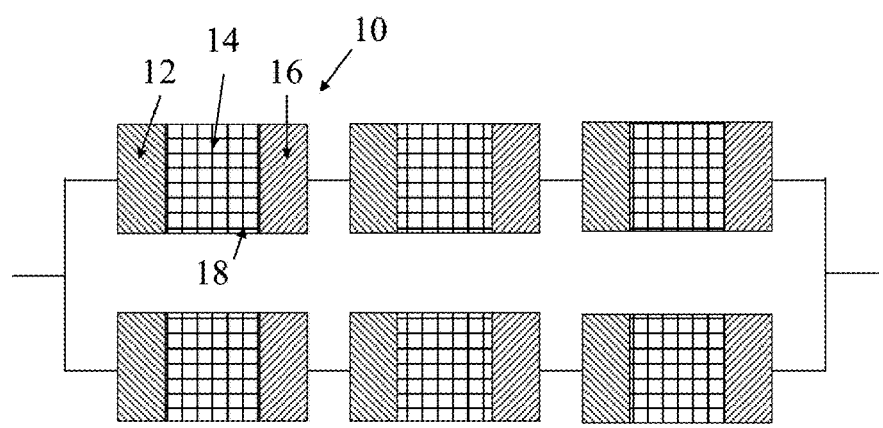
FIG. 18 depicts a schematic representation of a battery consisting of a plurality of cells connected electrically in series and in parallel.

A detailed schematic illustration of a lithium electrochemical cell 10 of the invention is shown in FIG. 17. Cell 10 comprises negative electrode 12 separated from positive electrode 16 by a separator 14 saturated with the electrolyte, all contained in insulating housing 18 with suitable terminals (not shown) being provided in electronic contact with negative electrode 12 and positive electrode 16 of the invention. Positive electrode 16 comprises metallic collector plate 15 and active layer 17 comprising the cobalt-stabilized lithium metal oxide material described herein. FIG. 18 provides a schematic illustration of one example of a battery in which two strings of electrochemical cells 10, described above, are arranged in parallel, each string comprising three cells 10 arranged in series.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, The embodiments of the invention in which an exclusive property or privilege is claimed are defined as follows:

1. An electrode material comprising a two-component, structurally integrated layered-spinel composite lithium metal oxide, which in an initial state has the formula:

$y\text{LiM'O}_2 \cdot (1-y)\text{Li}_{1+d}\text{Mn}_{2-z-d}\text{M''}_z\text{O}_4$;

wherein:
$0.75 \leq y < 1$;
$0 < z \leq 2$;
$0 \leq d \leq 0.2$;
$z-d \leq 2$;
M' comprises one or more metal ions that together have a combined average oxidation state of +3; and
M'' comprises one or more metal ions that together with the Mn and excess proportion, d, of lithium, have a combined average oxidation state of +3.5; and
wherein the $\text{Li}_{1+d}\text{Mn}_{2-z-d}\text{M''}_z\text{O}_4$ component comprises a spinel crystal lattice structure; the LiM'O$_2$ component thereof comprises a layered crystal lattice structure; at least one of M' and M'' comprises Co; and the spinel and layered structures are integrated together into a single composite structure.

2. The electrode material of claim 1, wherein $0.85 \leq y < 1$.

3. The electrode material of claim 1, wherein $0.9 \leq y < 1$.

4. The electrode material of claim 1, wherein $0.85 \leq y \leq 0.9$.

5. The electrode material of claim 1, wherein M' comprises at least one metal selected from the group consisting of Mn, Ni, and Co; and M'' comprises at least one metal selected from the group consisting of Ni and Co.

6. The electrode material of claim 5, wherein M' further comprises at least one metal selected from the group consisting of Al, Mg, Li, and a first or second row transition metal other than Mn, Ni and Co; and M'' further comprises at least one metal selected from the group consisting of Al, Mg, and a first or second row transition metal other than Mn, Ni and Co.

7. The electrode material of claim 1, wherein $0 < d \leq 0.2$; $0.2 < z \leq 0.6$; and M'' comprises Ni, Co, or a combination thereof.

8. The electrode material of claim 1, wherein M'' comprises at least one metal selected from Ni and Co.

9. The electrode material of claim 1, wherein M' comprises Mn and Ni.

10. The electrode material of claim 9, wherein M' further comprises Co.

11. The electrode material of claim 1, wherein the spinel component, $\text{Li}_{1+d}\text{Mn}_{2-z-d}\text{M''}_z\text{O}_4$, comprises Mn, Ni, and Co.

12. The electrode material of claim 1, wherein M' comprises Mn and Ni; and the spinel component, $\text{Li}_{1+d}\text{Mn}_{2-z-d}\text{M''}_z\text{O}_4$, comprises Mn, Ni, and Co.

13. The electrode material of claim 1, wherein M'' comprises at least one metal selected from the group consisting of Ni and Co; $d > 0$; and $2-d-z > 0$.

14. The electrode material of claim 1, wherein M'' comprises Ni and Co; Co constitutes about 1 atom percent to about 30 atom percent of transition metals in spinel component, $\text{Li}_{1+d}\text{Mn}_{2-z-d}\text{M''}_z\text{O}_4$; and the combination of Mn and Ni constitutes about 70 atom percent to about 99 atom percent of the transition metals in the spinel component.

15. The electrode material of claim 14, wherein the combination of Mn and Ni constitutes about 80 atom percent of the transition metals in the spinel component and Co constitutes about 20 atom percent of the transition metals in the spinel component.

16. The electrode material of claim 14, wherein the spinel component constitutes about 50 atom percent Mn, about 30 atom percent Ni, and about 20 atom percent Co of the transition metals in the spinel component.

17. The electrode material of claim 1, wherein the Li, Mn, M' and M'' cations are partially disordered over octahedral and tetrahedral sites of the layered and spinel crystal lattice structures of the composite lithium metal oxide structure.

18. A positive electrode for a lithium electrochemical cell comprising a layer of the electrode material of claim 1 in contact with a metal current collector.

19. A lithium electrochemical cell comprising the positive electrode of claim 18 and a negative electrode in contact with a non-aqueous electrolyte comprising a lithium salt.

20. A lithium battery comprising a plurality of the electrochemical cells of claim 19 connected together in series, parallel, or both.

* * * * *